United States Patent [19]
Imanishi et al.

[11] Patent Number: 6,124,964
[45] Date of Patent: Sep. 26, 2000

[54] ORGANIC/INORGANIC COMPOSITE SUPERLATTICE TYPE OPTICAL MODULATOR

[75] Inventors: Yasuo Imanishi; Shingo Ishihara; Tomoyuki Hamada, all of Hitachi, Japan

[73] Assignee: Hitachi, Ltd., Tokyo, Japan

[21] Appl. No.: 09/086,417

[22] Filed: May 29, 1998

[30] Foreign Application Priority Data

May 30, 1997 [JP] Japan ................................ 9-142086

[51] Int. Cl.[7] ........................... G02F 1/03; H01L 35/24
[52] U.S. Cl. .................... 359/248; 359/321; 359/322; 257/21; 257/40
[58] Field of Search ................................ 359/248, 321, 359/322; 257/40, 21

[56] References Cited

U.S. PATENT DOCUMENTS

| | | | |
|---|---|---|---|
| 5,020,881 | 6/1991 | Matsuda et al. | 359/248 |
| 5,543,631 | 8/1996 | Weinberger | 257/40 |
| 5,783,292 | 7/1998 | Tokito et al. | 428/212 |
| 6,005,707 | 12/1999 | Berggren et al. | 359/322 |

FOREIGN PATENT DOCUMENTS

| | | |
|---|---|---|
| 1-166555 | 6/1989 | Japan . |
| 3-126040 | 5/1991 | Japan . |

OTHER PUBLICATIONS

P.N. Butcher et al, *The Elements of Nonlinear Optics*, Cambridge Present Optical Research 9, Cambridge University Publisher 1990, pp. 1–11 & 172–189.

Takahashi, et al, NTT & D, vol. 45, pp. 355–362, 1996.

K. Tajima, *All–Optical Switch with Switch–off Time Unrestricted by Carrier Lifetime*, JPN, J.Appl. Phys. vol. 32, (1993), pp. L1746–L1749, Part 2, No. 12A, Dec. 1, 1993.

C. Kittel, Introduction to Solid–State Physics, Kotai Butsurigaku Nyumon II, translated by Uno et al., pp. 8–13 & 204–222. (no date available).

N.A. Goryunva et al., Zh. Tekn. Fiz. vol. 25, pp. 2419–2422, 1955.

D. Roger, et al, *X–ray Crystal Structure of Dichlorophthalocyaninatotin (IV)*, Chemistry Communications, pp. 840–841, 1971.

*Primary Examiner*—Georgia Epps
*Assistant Examiner*—Evelyn A. Lester
*Attorney, Agent, or Firm*—Antonelli, Terry, Stout & Kraus, LLP

[57] ABSTRACT

In an organic/inorganic composite superlattice type optical modulator capable of entering/projecting light, and capable of modulating an optical characteristic such as transmittance, reflectivity, and a refractive index of light in response to an externally controlled electric field, or light, the organic/inorganic composite superlattice type optical modulator includes at least one type of a compound semiconductor layer and at least one type of an organic compound layer; the compound semiconductor layer and the organic compound layer are alternately stacked in greater than one period; at least one of the compound semiconductor layer and the organic compound layer being crystalline; and also a thickness of each of the layers is made larger than a Bohr radius of the compound semiconductor and smaller than 10 times the Bohr radius. As a result, this novel optical modulator can provide a high nonlinear characteristic by a semiconductor modulator, and a high response characteristic by an organic modulator.

6 Claims, 4 Drawing Sheets

ORGANIC/INORGANIC COMPOSITE SUPERLATTICE TYPE OPTICAL MODULATOR

BACKGROUND OF THE INVENTION

The present invention generally relates to a optical modulator having superior 3 rd-order nonlinear optical performance. More specifically, the present invention is directed to an organic/inorganic composite superlattice type optical modulator suitable for an optical communication, and an optical information processing operation with employment of a large-capacity light pulse stream, and a response speed on the order of sub-picosecond, and also low switching power. The large-capacity light pulse stream owns a pulse time width less than several tens of picoseconds.

In connection with rapid development in current multimedia fields, a strong demand is made in order to transmit/receive large amounts of information through large-capacity highspeed optical communications.

Presently, electric signals transmitted via telephone lines from information originating sources such as a plurality of homes and offices are collected to a repeater station operated for a long distance communication. In this repeater station, these electric signals are converted into light signals. Then, a large number of light signals are transmitted from this repeater station via optical fibers to another repeater station located apart from the first-mentioned repeater station by approximately several hundreds Km (kilometers). In this repeater station, these light signals are again converted into electric signals which will be sent to a target information receiving source.

A strong need is made as to not only an increase in the quantity of information originating sources for utilizing such a optical communication, but also large data capacities (e.g., computer data files and computer graphics) and highspeed data communications in addition to simple speech (voice) information.

Furthermore, to realize more highspeed communications, electric signals produced from all of information originating sources are gradually, optically processed to emit light signals. To this end, shorter light pulses are employed so as to increase a signal transmission amount per unit time.

Optical fibers used in such a light signal transfer operation are selected from optical fibers made of mainly silica glass. Thus, light having a wavelength of 1.3 $\mu$m, or 1.5 $\mu$m is utilized as signal light, under which the light transfer loss of this silica glass fiber is minimized.

For instance, the light transfer loss occurred in this wavelength of 1.3 $\mu$m, or 1.5 $\mu$m is on the order of 0.5 dB/Km. When the wavelength is slightly shifted, the resultant light transfer loss will exceed 1 dB/Km. As a consequence, as a light source used in an optical communication, such laser light with superior monochromaticity fitted to a characteristic of this optical fiber is employed. The intensity of this specific laser light is varied by an optical modulator in response to an electric signal providing information, and thus a light pulse stream is produced to form a desirable light signal.

Even when such a light pulse is used to carry out in an optical communication, if this light pulse is transferred over a line of several hundreds Km, then this light pulse is attenuated. Accordingly, a repeater for amplifying the light pulse is employed in a halfway of this long line.

In a repeater used now, a light signal received by the repeater is converted to an electrical signal by an optical detector to execute electrically decoding processings of amplification, reproducing, retiming and so on, so that a laser light is modulated by such the electrical signal and transmitted to a next station as a light signal.

As explained above, the following demodulating technique is required. That is, the light signal which has reached in the form of such a highspeed light signal is directly demodulated in the repeater without executing the electric process operations. This type of highspeed light modulation constitutes a necessary requirement in the high-capacity highspeed communication operable at the speed higher than several tens G bit/sec, which implies a limit in an electric signal processing operation. Therefore, light modulations by light with higher speeds are required.

When a light modulation is carried out by light, 4-light-wave mixing and an optical bistable phenomenon, and the like are employed which correspond to one of 3rd nonlinear optical effects of a substance. They are caused by a change in a nonlinear refractive index. Normally, when light is irradiated onto a substance, polarization is induced into the substance in direct proportion to a magnitude of a light electric field thereof.

A "nonlinear optical effect" implies all of such effects among polarization of a substance, which is induced when light is entered into the substance, that the polarization is directly proportional to an incident light electric field. The effects which are directly proportional to the second power of light electric field, the third power of light electric field, . . . , are referred to as a 2nd-order nonlinear optical effect, a 3rd-order nonlinear optical effect, . . . (see "The Elements of Nonlinear Optics" written by P. N. Butcher, and D. Cotter, Cambridge Present Optical Research 9, Cambridge University Publisher, 1990).

The polarization "P" caused by the 3rd-order nonlinear optical effect is expressed by the following formula [1] in the case that the substance owns the central symmetry:

$$P_\omega(t) = \epsilon_0 \left[ \chi^{(1)}(-\omega; \omega) + \frac{3}{4}\chi^{(3)}(-\omega; \omega, -\omega, \omega)|E_\omega(t)E_\omega^*(t)| \right] E_\omega(t) \quad [1]$$

In the above-described formula [1], symbol "t" indicates time, symbol "$\omega$" represents an angular frequency, symbol "$\epsilon_0$" denotes a dielectric constant (permittivity) in vacuum, and symbol "$E_{107}^{(t)}$" shows an incident light electric field. Also, symbol "$\chi^{(1)}$" indicates a linear susceptibility, and is defined by a linear refractive index "$n_0$" of a substance, and the following formula [2]:

$$n_0(\omega) = \sqrt{1 + \text{Re}\chi^{(1)}(-\omega; \omega)} \quad [2]$$

In the above-explained formula [2], symbol "Re" indicates that this value takes a real part of the linear susceptibility $\chi^{(1)}$. Also, symbol "$\chi^{(3)}$" indicates 3rd-order nonlinear susceptibility of a substance, and is defined by a 3rd-order nonlinear refractive index "$n_2$" of a substance, and the following formula [3]:

$$n_2(\omega) = \frac{3\text{Re}\chi^{(3)}(-\omega; \omega, -\omega, \omega)}{8n_0(\omega)} \quad [3]$$

As apparent from these formulae, a refractive index n ( ) of a substance may be expressed by the below-mentioned formula [4] based upon the linear refractive index "$n_0$" and the non-linear refractive index "$n_2$":

$$n(\omega) = n_0(\omega) + n_2(\omega)|E_\omega(t)|^2 = n_0(\omega) + n_2(\omega)I \quad [4]$$

In the above-mentioned formula [4], symbol "I" shows intensity of light. This reflects such a fact that when the intensity of light is low, the refractive index of the substance is seemed that this refractive index becomes a constant value "$n_0$" irrespective of the intensity of the incident light, whereas while intensity of strong light such as laser light is increased, the refractive index of the substance is changed.

As previously described, since a substance constant is modulated by such strong intensity light, physical characteristics of a refractive index, an absorption factor, polarization of light, and a phase of a substance are varied. As a result of these variations, a direction and intensity of light which passes through, or is reflected by this substance, may be changed.

Since such a light modulation is induced by a light electric field by incident light, polarization of a substance occurs in a speed of light, and physical characteristics thereof may be rapidly changed. However, the polarization once induced in the substance remains for a preselected time duration after the incident light has passed, and this time duration differs to each other, depending upon polarization mechanisms as substances.

For example, in a semiconductor such as "GaAs" and "InSb", excitons are produced which are separated into electrons and holes due to optical pumping. A time duration longer than several nanoseconds ($10^{-9}$ seconds) is required until these excitons are recombined with each other to be returned to original states. The reason is given as follows. Since the atoms for constituting the semiconductor are combined with each other in the regular manner due to the covalent bond by atoms, both the electrons and the holes separated from these electrons are travelled over a plurality of atoms, and therefore the electrons are located far from the holes.

To the contrary, as to organic molecule such as polydiacetylene and metal phthalecyanine, even when the molecules are brought into an excitation condition by optical pumping, since there is no covalent bond between the adjoining molecule, both electrons and holes are not separated from each other, but this excitation state is disactivated, so that only such a short time duration shorter than several picoseconds ($10^{-12}$ seconds) until these molecules under excitation state are returned to the original state.

On the other hand, if the electron charge amount of a polarized electrons is made equal to that of the polarized holes, then since the magnitude of the polarization of such a substance is directly proportional to the separated distance, there is a trade-off relationship between the magnitude of the polarization and the speed of the disactivation.

SUMMARY OF THE INVENTION

To realize excitation of such a substance having large polarization and a high deactivation speed, polarization of excitons of an anthracene single crystal surface and also of ZnSe fine crystal is known in this field. However, such an effect may be achieved only when a temperature of single crystal having a better quality is maintained under very low temperature lower than, or equal to 10 K. There are many problems that such a single crystal is not suitably manufactured in the massproduction method, and the exciton state thereof is readily disturbed by a very small defect and depending upon a holding condition.

In order that this exciton condition can be preferably utilized even under high temperature condition, the utilization of semiconductor superlattice belonging to (GaAs/GaAlAs)n and (InGaAs/InGaAsP)n has been proposed (see NTT R&D, volume 45, 355 page, in 1996, by TAKAHASHI, KAGAWA, and IWAMURA). However, there is another problem that the adverse influence caused by the thermal vibrations could not eliminated, as compared with the excitons under very low temperature condition. As a consequence, another method has been proposed as to the semiconductor superlattice by K. Tajima in Japanese Journal of Applied Physics, volume 32, 1746 page, 1993. In this proposed method, the condition once excited by the light is again induced/released by the light, while avoiding the control of the pure excitation phenomenon of the substance.

However, in accordance with this conventional method, since both the excitation light and the release light must be continuously irradiated on to the substance, this method cannot be utilized in such a case that the light pulse is irradiated on the substance in the high repetition frequency. Also, the time instant at which the light for deactivating the excitation condition is irradiated must be continuously measured.

Also, in the first-explained case of the anthracene single crystal surface and the ZnSe fine crystal, which may utilize the ideal exciton effect, since energy of the light for deactivating the excitation is stored within the substance, the initial performance thereof can be hardly maintained with respect to the highly repeated light pulse.

As previously described, there is no substance capable of realizing the excitation under weak light and the highspeed deactivation. This fact may cause difficulties in particular when the following optical modulation, and various types of optical elements using this optical modulation are tried to be realized. That is, the pulse width is smaller than, or equal to several picoseconds, and the light pulse is produced in the high repetition frequency higher than, or equal to terahertz.

The present invention has been made to solve the above-explained problems, and therefore, has an object to provide a novel optical modulator capable of commonly having a high nonlinear characteristic by a semiconductor modulator, and also a highspeed response characteristic by an organic modulator.

To achieve the above-described object, an organic/inorganic composite superlattice type light modulator, according to an aspect of the present invention, is featured by that in such an organic/inorganic composite superlattice type optical modulator capable of entering/projecting light, and capable of modulating an optical characteristic such as transmittance, reflectivity, and a refractive index of light in response to an externally controlled electric field, or light, the organic/inorganic composite superlattice type optical modulator includes at least one type of a compound semiconductor layer 1 and at least one type of an organic compound layer 2; the compound semiconductor layer 1 and the organic compound layer 2 are alternately stacked in at least one period; at least one of the compound semiconductor layer 1 and the organic compound layer 2 being crystalline; and also a thickness of each of the layers is made larger than a Bohr radius of the compound semiconductor and smaller than 10 times the Bohr radius.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENT

Figure 1:
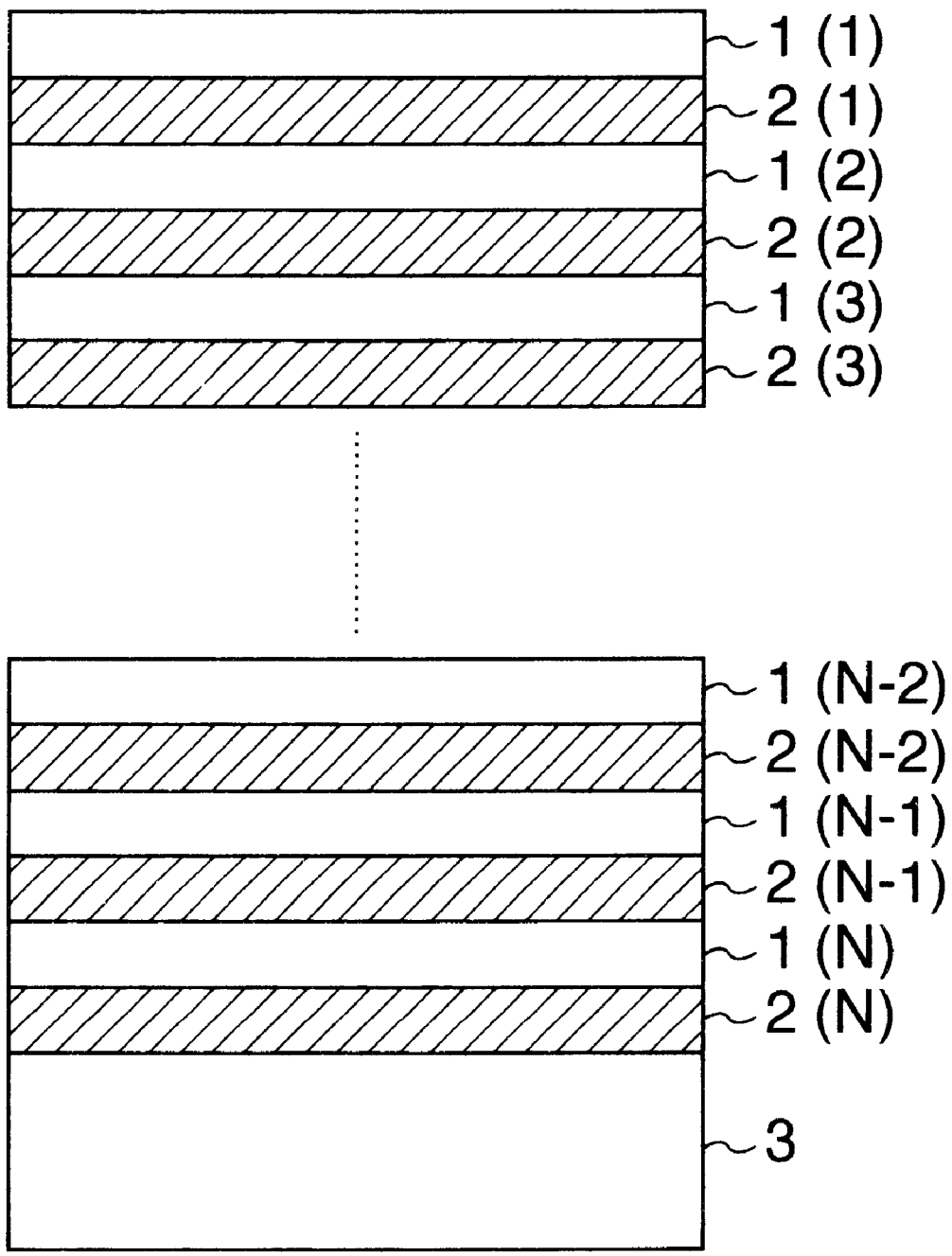
FIG. 1 is a schematic structural diagram for showing a basic structure of an optical modulator according to the present invention.

As shown in FIG. 1 as a compound semiconductor layer 1 of a medium capable of representing the light modulation effect according to the present invention, the following substances may be employed. That is, various types of elements are doped into a bulk of compound semiconductors, a low-dimensional crystal, or these compound semiconductors themselves such a GaAs, GaN, ZnSe, InP.

Also, as an organic compound layer 2, organic compounds such as [$H_2N-C_6H_6(-CH_3)-NO_2$], ($H_3C-H_6H_4-C=C-C_6H_4-CN$), polydiacetylene, polyacetylene, and metal phthalocyanine may be employed. In particular, in order to effectively cause the optical modulation, the 3rd-order nonlinear optical constant under a substance layer single body state, or a multi-layer state for constituting these organic compounds is preferably selected to be larger than, or equal to $10^{-10}$ esu in a wavelength of modulating light.

Also, in the above-described shape, either other different types of material or other materials having different structures from those of the present invention may be employed as co-existing states, or mixing states.

Also, in order to form these optical modulators, it is possible to employ a substrate 3 made of glass, silicon, or gallium arsenic (GaAs), for example.

As a method for manufacturing the optical modulator according to the present invention, various types of thin film forming techniques may be used, for instance, the spin coating method, the sputtering method, the vacuum vapor deposition method, the molecular beam vapor deposition method, the liquid phase epitaxial method, and the atomic layer epitaxial method. Also, these media may be treated by the polling process by way of the electric field or the magnetic field in order to cause the optical modulation effects thereof. Furthermore, a phase inversion distribution structure by partial ion exchanging method may be adopted.

In accordance with a required characteristic of a light pulse, various types of fine processing techniques may be employed so as to form the optical modulators. For example, there are the fine diamond cutting process, the laser process, the etching process, the photolithography, the reactive ion etching, and the focused ion beam etching. Alternatively, a plurality of pre-processed optical modulators are formed in a multilayer form, or arranged with keeping a constant interval. Alternatively, these pre-processed optical modulators arranged in a constant interval may be coupled to each other by employing optical waveguides, otherwise may be sealed under keeping this condition.

After the optical modulator of the present invention has been manufactured as the product, other process operations may be executed in order to improve the characteristic thereof, and achieve long lifetime thereof. As these post-treatment processes, there are the thermal annealing, the radiation irradiation, the electron beam irradiation, the light irradiation, the electromagnetic wave irradiation, the magnetic force line irradiation, and the ultrasonic wave irradiation.

In addition, this element may be made in a composite form by utilizing various means such as adhesion, melting adhesion, electro-adhesion, vapor deposition, pressure-adhesion, dye-adhesion, furnace-melting adhesion, mixing, press forming, and coating, depending on a purpose and a utilization.

More specifically, according to the present invention, the following means are advantages to improve the optical modulation characteristics. That is, electrodes are provided so as to control an electric condition of a substance, a mirror is additionally provided which is required to employ an optical resonator structure, or an optical waveguide structure in order to increase light intensity density, and media having different refractive indexes are additionally employed.

A medium indicative of the optical modulation effect is filled into a space which should construct a core surrounded by a clad layer, so that the optical amplification effect can be effectively achieved even under lower incident light intensity. In particular, as an optical parametric amplifying element with respect to a signal light pulse operated in a light communication range of wavelengths from 1,3 $\mu$m to 1.5 $\mu$m, a GaAlAs semiconductor laser and a titanium-doped sapphire solid-state laser having wavelengths of 0.65 $\mu$m to 0.8 $\mu$m may be employed as a pump light pulse. Otherwise, these laser elements may be manufactured as an integral body type element into which an optical waveguide and an optical fiber are assembled.

The optical parametric amplifying element, according to the present invention, may be applied to various types of optical functional elements assembled with, for instance, an optical wavelength converting element, an optical modulator, an optical switch, a light memory, an optical mixer, an optical phase separator, an optical phase conjugate mirror, an image display element, and an image printing element. In particular, external signal information other than the pump light pulse, for example, image information in a visible light range is superimposed on this pump light pulse, so that the optical parametric amplifying element may be employed as an element for writing/transferring a signal with respect to a light pulse stream in a communication frequency range.

As these concrete application examples, there are provided, a communication light waveguide, an optical cable, an optical integrated circuit, and a two-dimensional logic element.

In accordance with the present invention, since such a substance is formed under such a condition that a semiconductor layer is assembled with an excitation particle effect of an organic layer, and also the optical electric field intensity within the optical modulator is increased due to the localization field effect, the optical modulation characteristic can be more effectively obtained.

In other words, the optical modulator according to the present invention can modulate the light pulse in higher speeds than that of the conventional optical modulator manufactured only by the semiconductor. At the same time, this optical modulator of the present invention can be driven by the lower modulation power than that of the conventional optical modulator manufactured only by the organic material. The large-capacity optical communication information can be extracted in high speeds and in high repetition operations by employing such an optical modulator of the present invention.

Next, an optical modulator according to an embodiment of the present invention will now be described.

As a concrete example of the optical modulator according to the present invention, a description will now be made of such an optical modulator in which a multilayer thin film constructed of one type of compound semiconductor and also one type of organic compound is employed as an optical modulating medium.

FIG. 1 schematically illustrates a basic structural diagram of the optical modulating medium for constituting the optical modulator according to the present invention. In this embodiment, a compound semiconductor layer 1 and an organic compound layer 2 are sequentially stacked from a top layer in such a manner that a semiconductor layer 1, and organic layer 2, . . . , are successively stacked in "N" periods in a multilayer manner, while a repetition of the semiconductor layer 1 and the organic layer 2 is defined as 1 period. It should be understood that an i-th (i =1, 2, . . . , N) semiconductor layer and an i-th organic layer in such a multilayer film are indicated by "1(i)" and "2(i)", respectively.

Reference numeral 3 denotes a substrate used to mount the above-explained thin film. It should also be noted that although the order of the stacked layer with respect to this substrate 3 is defined as the substrate 3/organic layer 2/semiconductor layer 1, this order may be reversed such as the substrate 3/semiconductor layer 1/organic layer 2.

Each of the semiconductor layer 1 and each of the organic layer 2 are crystalline. When light is entered into such a medium, exciton may be produced. The "exciton" implies such a condition that when light is entered into crystal, atoms and molecules contained in this crystal are excited, and then pairs of electrons and holes constrained with these electrons are formed (see, e. g., "KOTAI BUTSURIGAKU NYUMON II" written by C. Kittel, translated by UNO et al., page 9, MARUZEN, 1986).

A distance between an electron and a hole when these electron and hole form a pair is referred to as Bohr radius. The typical Bohr radius of a semiconductor is given as follows: 58 angstrom in Si, 160 angstrom in Ge, 105 angstrom in GaAs, and 630 angstrom in InSb.

In contrast thereto, Bohr radius of organic crystal is on the order of 10 angstrom. This is because the static dielectric factor is smaller than that of the semiconductor, and the organic crystal is equal to molecular crystal. Accordingly, the mutual effect between the adjoining molecules is low, and both the electrons and the holes cannot be separated from each other over other molecules.

Since the many-body effect as in the exciton is not represented in the semiconductor smaller than this size, the semiconductor layer according to the present invention may advantageously have the film thickness larger than this Bohr radius. At the same time, when the exciton of the semiconductor layer 1 is mixed with the excitation of the organic layer 2, there is a certain possibility that energy of the exciton produced in one layer is moved to the other layer, and then disappears in this layer.

In order that such an exciton mixture can effectively occur, the excitons are preferably localized in the vicinity of the boundary between the semiconductor layer 1 and the organic layer 2. Moreover, in order to achieve the above-described dimension required to stably produce the excitons, in particular, the film thickness of the semiconductor layer having the large Bohr radius is preferably made smaller than 10 times this Bohr radius. If the film thickness is made larger than 10 times this Bohr radius, then larger numbers of excitons are produced in the center portion of the semiconductor layer rather than the portion in the vicinity of the boundary, resulting in lowering of the effect.

Next, a more concrete manufacturing example of the multilayer structure constituted by the semiconductor layer 1 and the organic layer 2 will be described based upon the basic designing policy of the optical modulator medium of the present invention.

First, as to a material, CdSe (manufactured by REAME-TARIKUSU company, purity of 99.9999%) was employed for the compound semiconductor, whereas $SnCl_2Pc$ was employed for the organic compound. $SnCl_2Pc$ [molecular formula: $SnCl_2C_2H_{16}N_8$ (manufactured by TOKYO KASEI Co., Ltd.)] was cleaned by using ethanol, thereafter this cleaned $SnCl_2Pc$ was sublimation-refined under base pressure of $10^{-5}$ Torr, purity thereof was 99.9%.

Crystal glass was used as the substrate 3, and this crystal glass was cleaned by way of the acetone ultrasonic cleaning. The substrate was mounted on a holder made of molybdenum, and other materials were stored in a crucible made of boron nitride (manufactured by SHINETSU KAGAKU Co., Ltd.), which were entered into a cell. This cell was set to the molecular beam vapor deposition apparatus (model IMBE-620, base pressure of $5 \times 10^{-10}$ Torr, manufactured by NICHIDEN ANELVA Co., Ltd.). The chamber, the substrate, and the cell were degased at the temperature of 200° C.

Next, while the chamber was cooled by using liquid nitrogen, the cell for CdSe was heated at the temperature of 625° C., whereas the cell for $SnCl_2Pc$ was heated at the temperature of 330° C. While the molecular beam amount was selected to be approximately $1 \times 10^{-7}$ Torr to vapor-deposit by the beam flux monitor, the vapor deposition speed was adjusted, and the substrate temperature was 23° C. While the shutters mounted on the eject ports of the respective cells were alternately opened/closed, the organic layers 2 and the semiconductor layers 1 were alternately stacked on the substrate. The film thicknesses of the respective stacked layers were adjusted by controlling the open time of the shutters.

Figure 2A:
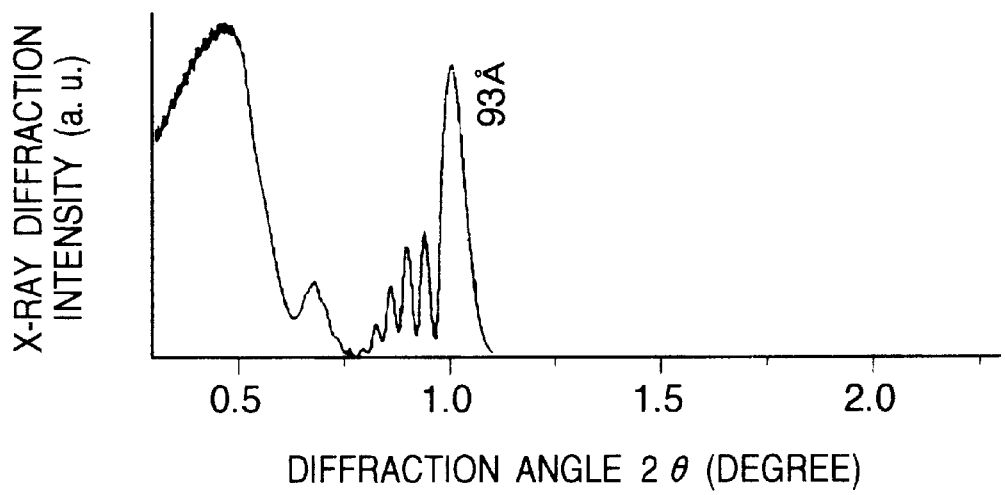
FIG. 2A and FIG. 2B graphically represent X-ray diffraction patterns of an organic/inorganic multilayer film of an optical modulator according to an embodiment of the present invention.
Figure 2B:
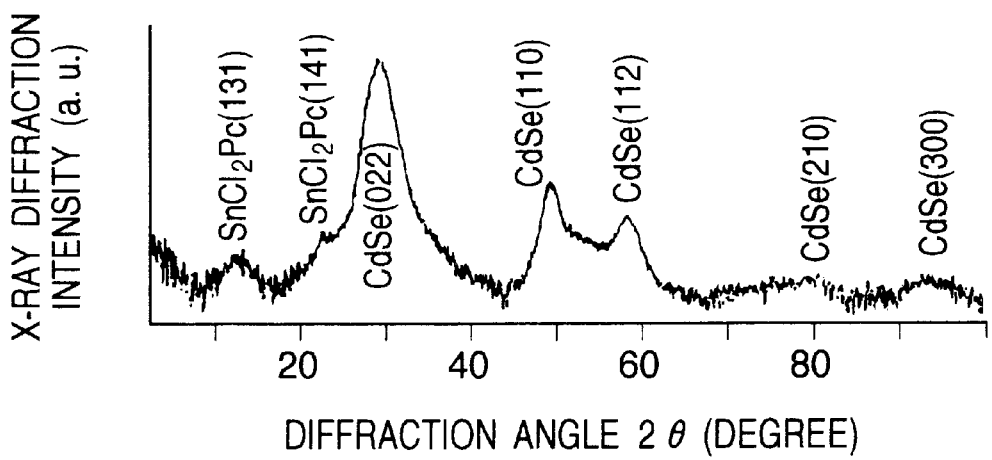

Subsequently, there is shown an evaluation result about the periodic structure and the crystalline of the manufactured film. FIGS. 2A and 2B represent an X-ray diffraction analysis result of a film thickness ratio of 1:1, a periodic length of 93 angstrom, and a periodic number of 20.

FIG. 2A indicates a diffraction pattern of a narrow angle region, and FIG. 2B represents a diffraction pattern of a wide angle region. In the narrow angle region, it is recognized that a strong diffraction peak corresponding to a periodic length of 93 angstrom appears in the vicinity of approximately 1 degree, so that the multilayer structure made of the semiconductor layer 1 and the organic layer 2 can be manufactured in accordance with the set design.

Also, it is recognized that a plurality of diffraction peaks appear in the wide angle region. When these diffraction peaks belong from the publications of the single crystal structures of CdSe and $SnCl_2Pc$ (CdSe: N. A. Goryunva, V. A. Kotovich and V. A. Frank-kamenetskii, Zh. Tekn. Fiz. vol 25, 2419 pages in 1955; $SnCl_2Pc$: D. Rogers and R. S. Osborn, Chemistry Communication, 840 page, in 1971), these diffraction peaks can belong to the specific orientation of CdSe and $SnCl_2Pc$, as indicated in the drawing. It could be understood that both the semiconductor layer 1 and the organic layer 2 are crystalline in this multilayer film.

Figure 3:
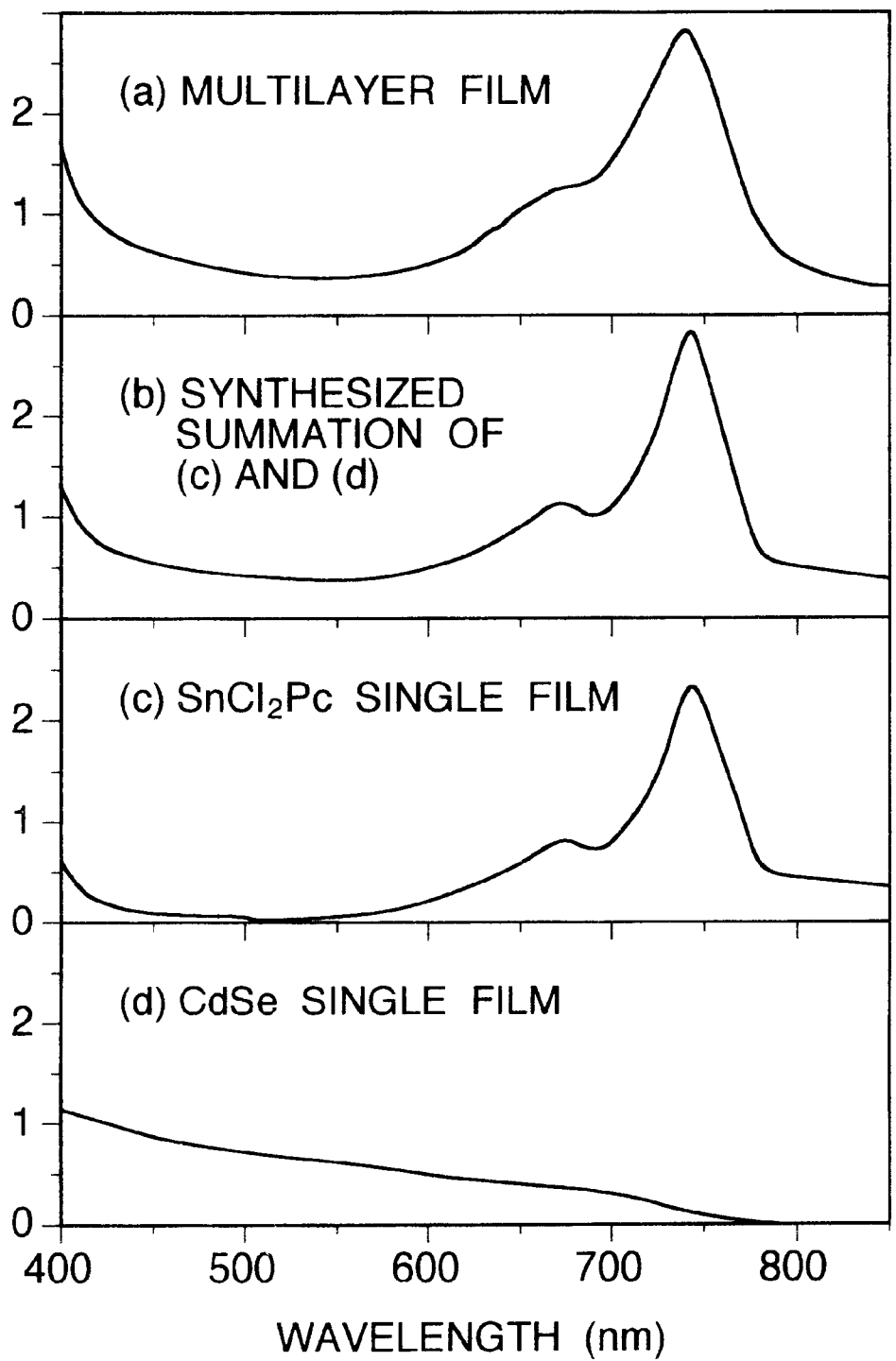
FIG. 3 graphically indicates a visible light/near infrared absorption spectrum of the organic/inorganic multilayer film of the optical modulator according to the embodiment of the present invention.

Next, there is indicated an evaluation result for evaluating an optical characteristic of the formed film. FIG. 3(a) indicates a visible light/near infrared absorption spectrum of the formed film under such a same condition that the film thickness ratio is 1:1, the periodic length is 93 angstrom, and the periodic number is 20 at the room temperature. For the sake of comparison, FIG. 3(c) shows an SnCl$_2$Pc single film; FIG. 3(d) represents a CdSe single film absorption spectrum; and FIG. 3(b) indicates a synthesized spectrum of the spectra of these single films.

As the spectra of the single film, in the SnCl$_2$Pc single film shown in FIG. 3(c), a peak caused by the p–p* electron excitation of phthalocyanine appears in the vicinity of 740 nm, whereas in the CdSe single film shown in FIG. 3(d), a wide absorption band caused by a band gap of a semiconductor widely appears in a short wave region than 700 nm.

The spectrum of the multilayer film shown in FIG. 3(a) is substantially equal to the synthesized spectrum of the single films shown in FIG. 3(c) and FIG. 3(d), and the spectrum of the single film shown in FIG. 3(b). It could be understood that the respective components of the multilayer film were stacked as the crystalline thin films without receiving the deformation caused by the multilayer film.

Next, another evaluation result is shown, in which the 3rd-order nonlinear optical characteristic related to the optical modulation characteristic of the formed film is evaluated.

As a light source, titanium sapphire laser with argon gas laser excitation was employed (manufactured by COHERENT company; center wavelength of 790 nm; pulse width of 80 fsec; spectrum width of 15 nm; repetition frequency of 78 MHz; pulse energy of 30 nJ). This light pulse was amplified by the titanium sapphire reproducing amplifier with YLF (YLiF4) laser excitation, and this amplified light pulse was employed. The titanium sapphire reproducing amplifier was manufactured by B.M. INDUSTRIES, under center wavelength of 790 nm, pulse width of 100 fsec, spectrum width of 15 nm, repetition frequency of 1 KHz, and pulse energy of 20 mJ.

The nonlinear optical susceptibility $\chi^{(3)}(-\omega:\omega,-\omega,\omega)$ was measured by using this light pulse by way of the reduced 4-light-wave mixing method with the box-car arrangement.

In this case, as to the multilayer film, a total film thickness became 3600 angstrom, and the periodic length was changed from 45 angstrom to 1800 angstrom under 1:1. As to the single film in comparison with this multilayer film, such a film whose film thickness became 1800 angstrom was employed.

The absorption spectra of these multilayer film samples at the room temperature own similar shapes, and further the total film thicknesses thereof were smaller than the measured wavelengths. As a consequence, while these multilayer film samples were recognized as uniform films in the analysis thereof, the nonlinear optical susceptibility $\chi^{(3)}$ was calculated. Table 1 represents a measurement result of the 3rd-order nonlinear optical characteristic, in which the measurement values of this nonlinear optical susceptibility $\chi^{(3)}$ were indicated while the SnCl$_2$Pc single film was set to 1.

TABLE 1

|  | Periodic length (Å) | Periodic number | $\chi^{(3)}$ ratio |
|---|---|---|---|
| Multilayer film | 45 | 40 | 3.6 |
|  | 90 | 20 | 3.5 |
|  | 180 | 10 | 2.3 |

TABLE 1-continued

|  | Periodic length (Å) | Periodic number | $\chi^{(3)}$ ratio |
|---|---|---|---|
|  | 360 | 5 | 1.2 |
|  | 900 | 2 | 1.0 |
|  | 1800 | 1 | 1.0 |
| Single film | CdSe |  | 0.05 |
|  | SnCl$_2$Pc |  | 1 |

As apparent from the results of table 1, the nonlinear optical susceptibility $\chi^{(3)}$ of the multilayer film was equal to that of the SnCl$_2$Pc single film under such a condition that the periodic length is longer than, or equal to 900 anstrom. The nonlinear optical susceptability $\chi^{(3)}$ of the multilayer film was gradually increase under such a condition that the periodic length is shorter than, or equal to 360 angstrom.

As previously described, since the semiconductor layer 1 and the organic layer 2 were used to manufacture the multilayer, it could be seen that the 3rd-order nonlinear optical susceptibility related to the optical modulation characteristic could be improved.

Although this improvement reason cannot be yet analyzed, the following consideration may be conceived. That is, in this wavelength range, the CdSe layer owns the longer wavelength than the band edge. Accordingly, the nonlinear characteristic by CdSe gives small contribution. The static dielectric factor of CdSe becomes approximately 2.7, whereas the static dielectric factor of SnCl$_2$Pc, namely organic material, becomes approximately 1.6. Accordingly, the localization field effect may be achieved.

Next, similar to the embodiment 1, a multilayer structure is formed of a semiconductor layer 1 and an organic layer 2, while employing [Zn$_x$Cd$_y$Se, (x=0.2, y=0.8)] as the compound semiconductor; CuPc as the organic compound; and a (GaAs) single crystal substrate [orientation (001) plane] as the substrate. Now, a description will be made of a result of analyzing an optical modulation characteristic of this multilayer structure.

As a method for manufacturing a sample, similar to the embodiment 1, the molecular beam vapor deposition method is utilized. As to the vapor deposition materials, ZnSe (manufactured by METARIKUSU COMPANY by a purity level of 99.9999%) was employed as the semiconductor material; CdSe (manufactured by METARIKUSU Company by a purity level of 99.9999%) was employed as this semiconductor material; and CuPc [CuC$_8$H$_{16}$N$_8$ (manufactured by TOKYO KASEI Co., Ltd.) was used as the organic material. The organic material of CuPc was sublimation-refined under base pressure of 10$^{-5}$ Torr, and purity thereof was 99.9%.

The respective vapor deposition materials were stored into the crucible made of boron nitride (manufactured by SHINETSU KAGAKU Co., Ltd.), and a cell was mounted on the molecular beam vapor deposition apparatus. A GaAs single crystal substrate (manufactured by HITACHI KINZOKU Co., Ltd., orientation (001) plane) was used as the substrate. After the pure water ultrasonic cleaning, the acetone ultrasonic cleaning, the isopropanol ultrasonic cleaning, and the pure water ultrasonic cleaning were carried out for this substrate, the cleaned substrate was dipped for 90 seconds at a temperature of 60° C. into a mixed solution made by mixing not-diluted sulfuric acid, hydrogen peroxide, and pure water in the mixing ratio of 4:1:1. Then, the etching treatment and the pure water cleaning were carried out for this substrate. The resultant substrate was dried by using dry nitrogen. Then, while the dried substrate was mounted on the holder made of molybdenum, this dried substrate was mounted in the molecules beam vapor deposition apparatus.

Next, while the chamber was cooled using liquid nitrogen, the substrate was heated at the temperature of 580° C. under ultra high vacuum pressure condition before the vapor deposition was carried out after appearing of the cleaned surface of GaAs was monitored by the reflection type electron beam diffraction apparatus (RHEED), the cell for ZnSe was heated at the temperature of 810° C., the cell for CdSe was heated at the temperature of 625° C., whereas the cell for $SnCl_2Pc$ was heated at the temperature of 360° C. While the molecular beam amount was selected to be approximately $1\times10^{-7}$ Torr to vapor-deposit by the beam flux monitor, the vapor deposition speed was adjusted, and the substrate temperature was lowered below 250° C. While the shutters mounted on the eject ports of the respective cells were alternately opened/closed, the organic layers 2 and the semiconductor layers 1 were alternately stacked on the substrate.

In this case, since the semiconductor layer 1 was 2 elements of ZnSe and CdSe, the composite ratio thereof was determined by the X-ray optical electron spectroscope apparatus (XPS) employed in the molecular beam vapor deposition apparatus. The film thicknesses of the respective layers were calculated from the vapor deposition time ratio on the basis of the film thickness of the single film manufactured under similar vapor deposition condition.

Next, the light emission lifetime of optical pumping related to a light switching characteristic was evaluated by using the manufactured organic/inorganic composite film, which is represent in table 2:

TABLE 2

|  | Periodic length (Å) | Periodic number | Light emmision lifetime |
|---|---|---|---|
| Multi-layer film | 45 | 40 | 900 |
|  | 90 | 20 | 2000 |
|  | 180 | 10 | 5000 |
|  | 360 | 5 | 10000 |
|  | 900 | 2 | 10000 |
|  | 1800 | 1 | 10000 |
| Single film | $Zn_xCd_ySe(x = 0.2, y = 0.8)$ |  | 10000 |
|  | CuPc |  | (No light emission) |

As represented in table, 2 while a total film thickness was selected to be 3600 angstrom, the multilayer film whose periodic length was changed from 45 angstrom to 1800 anstrom was formed, and the single film having a total thickness of 1800 angstrom was formed for a comparison purpose.

The light emission lifetime by the optical pumping was evaluated as follows: As a light source, titanium sapphire laser with argon gas laser excitation was employed (manufactured by COHERENT company; center wavelength of 790; pulse width of 80 fsec; spectrum width of 15 nm; tition frequency of 78 MHz; pulse energy of 30 nj). This light pulse was amplified by the titanium sapphire reproducing amplifier with YLF ($YLiF_4$) laser excitation, and this amplified light pulse was employed. The titanium sapphire reproducing amplifier was manufactured by B.M. INDUSTRIES, under center wavelength of 790 nm, pulse width of 100 fsec, spectrum width of 15 nm, repetition frequency of 1 KHz, and pulse energy of 20 mJ. The light pulse which was converted into the second harmonic wave by BBO ($B-BaB_2O_4$) crystal was used. This light pulse was irradiated onto the surface of the thin film at the incident angle of 45°, and the scattered light along the direction of the reflection angle of 0° is condensed, which was measured by the spectrometer-integration type picosecond streak camera (manufactured by HAMAMATSU-PHOTONICS Co., Ltd.) to obtain the light emission lifetime which is indicated in table 2.

Copper phthalocyanine did not emit light among the respective components. The light emission lifetime of $Zn_x$-$Cd_ySe$ was 10,000 ps in the form of single film. However, when the periodic length thereof was small, the length was shortened less than 360 angstrom. The lifetime of the exciton produced in the semiconductor layer was shortened, so that the optical response characteristic was improved. In particular, when the periodic length became 45 angstrom, the light emission lifetime was on the order of 900 ps, which would be shortened by approximately $\frac{1}{100}$, as compared with the lifetime of the single film.

With employment of an optical modulator containing the organic/inorganic multilayer film manufactured in the embodiment 1, a femto-second light pulse extraction experiment was carried out.

Figure 4A:
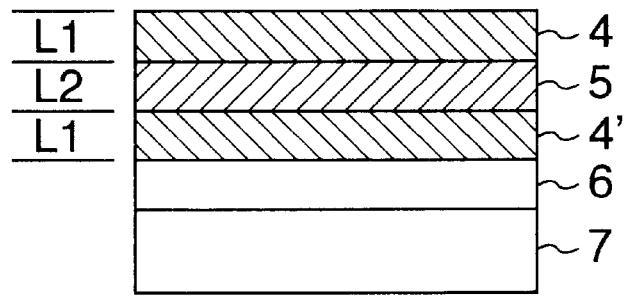
FIG. 4A schematically indicates an element structure of an optical modulator according to another embodiment of the present invention.

A sample was manufactured by way of the molecular beam vapor deposition method similar to the embodiment 1. However, in order to improve the performance of this optical modulator, the following optical modulator was formed. That is, in addition to the organic/inorganic multilayer film, a buffer layer was additionally provided under the below-mentioned condition. A basic structure of this optical modulator element is indicated in FIG. 4A.

An optical modulating portion of the element is constituted by an organic/inorganic composite multilayer film 5 having a thickness of L2, and buffer layers 4 and 4' which each have thicknesses of L1, and sandwich this composite multilayer film 5. This optical modulating portion is formed on a reflection mirror 6 capable of reflecting 100% of incident light. Furthermore, this mirror 6 is provided on a substrate 7.

The optical modulation is carried out in accordance with the Kerr-shutter method in such a manner that both signal light and control light having a polarization plane different from that of the signal light at an angle of 45° are entered from the upper direction into this optical modulator, the light which has passed through the optical modulation layers (4, 5, 4') is reflected on the reflection mirror 6 and thereafter passes through the optical modulation layers again, and then this light is projected from the optical modulating portion. The projected light was polarized/analyzed so as to measure a switching characteristic of this optical modulator.

In other words, when there is no control light, the linear-polarized signal light is projected from the light modulator as the linear-polarized reflection light. When the control light is entered into the optical modulator, since the light having the component perpendicular to the linear polarized signal light is also generated, this newly generated light having the vertical component can be sensed. As a result, the signal light can be derived by using the control light.

This element was manufactured in such a way that a glass substrate (surface precision $=\lambda/20$) was employed as the substrate 7, and a total reflection mirror (manufactured by Sigma KOKI Co., Ltd.) was vapor-deposited on this substrate 7, which was constructed of a dielectric multilayer as the reflection mirror 6.

This is employed as a substrate for vapor deposition. Then, the optical modulation layer was formed by way of a similar method as in the embodiment 1. $CaF_2$, was used as the buffer layer 4, and both CdSe and $SnCl_2Pc$ which have been used in the embodiment 1 were employed as the organic/inorganic multilayer. These vapor deposition substrate and vapor deposition source were mounted on the same molecular beam vapor deposition apparatus, and the thickness of the vapor-deposited film was determined by controlling the vapor deposition time.

Figure 4B:
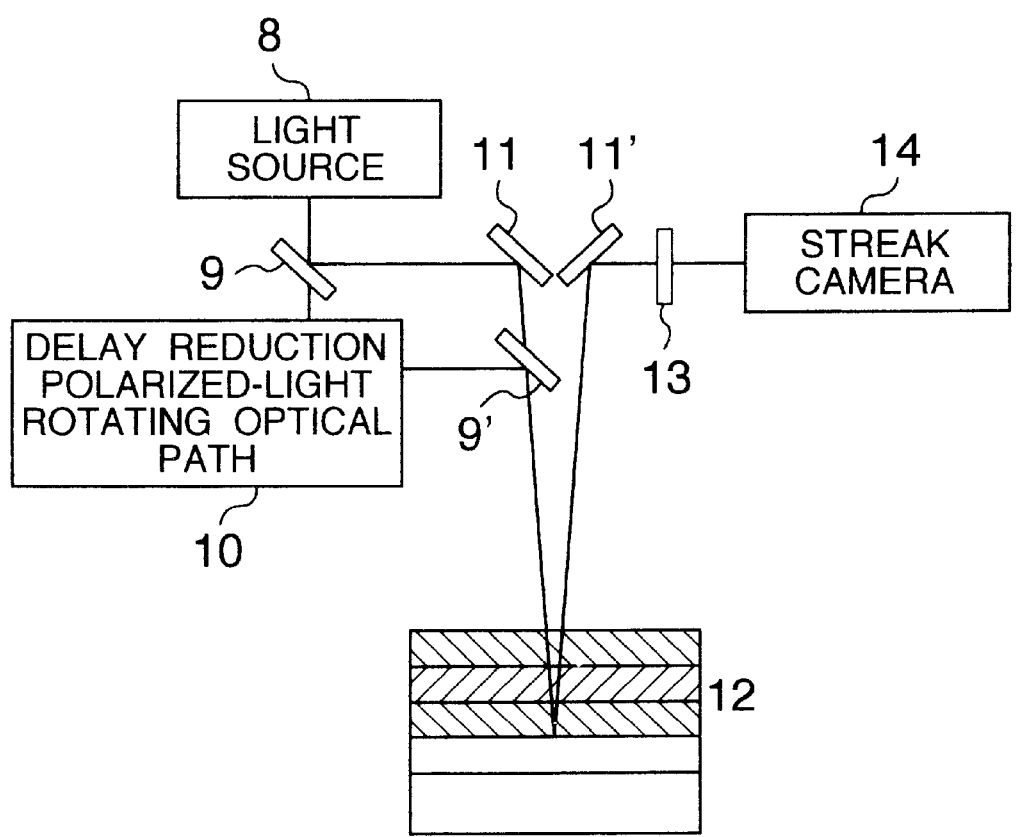
FIG. 4B is a schematic structural diagram of a modulation characteristic evaluation optical system.

FIG. 4B schematically indicates an optical system capable of evaluating an optical modulation characteristic. As an light source 8, the titanium sapphire laser and the reproducing amplifier are employed which have been used in the embodiment 1. A light pulse emitted from the light source 8 is split into two sets of light pulses by a beam splitter 9. One light pulse is reflected on a mirror 11 to produce control light, and the other light pulse is processed to produce signal light in such a manner that intensity of this light pulse is reduced by 1/10 in a delay reduction polarized-light rotating optical path 10, and a polarization plane is rotated by 45 degrees.

Two sets of light are combined with each other to again produce single light by another beam splitter 9', and then this single light is entered into an optical modulator 12. The incident light is modulated in this optical modulator 12, and then the modulated light is projected from this optical modulator 12. The projected light is reflected on another mirror 11', and then the reflected light is entered into a polarizer 13. Only a light component perpendicular to the polarization direction of the original signal light may pass through this polarizer. This transmitted light was detected by a streak camera 14.

In this case, such an optical modulator was manufactured in such a manner that an entire thickness L2 of the organic/inorganic multilayer was equal to 1500 angstrom, the periodic length was fixed to 100 angstrom, and a thickness L1 of the buffer layer was changed. Table 3 indicates a detection/measurement result of this transmission light. Table 3 shows the measurement result of the Kerr-shutter type optical modulation characteristic, from which the optical modulation effect could be monitored.

TABLE 3

| Total film thickness (L1 × 2 + L2) | Detection intensity (a.u.) |
| --- | --- |
| 1500 Å | 0.2 |
| 1975 Å | 0.3 |
| 3950 Å | 2.0 |
| 7900 Å | 1.4 |
| 20000 Å | 0.2 |

Next similar to the embodiment 1, as to a material, Cdse was employed for the compound semiconductor, and $Sncl_2C_8H_{16}N_8$ [molecular formula: $SnCl_2C_2H_{16}N_8$] was employed for the organic compound. A composite multilayer film was formed undera similar vapor deposition condition, while setting a substrate temperature at 250° C. Crystal glass was used as the subtrate, and this crystal glass was cleaned by way of the acetone ultrasonic cleaning.

The substrate was mounted on a holder made of molybdenum, and other materials were stored in a crucible made of boron nitride (manufactured by SHINETSU KAGAKU Co., Ltd.), which were entered into a cell. This cell was set to the molecular beam vapor deposition apparatus (model IMBE-620, base pressure of $5 \times 10^{-10}$ Torr, manufactured by NICHIDEN ANELVA Co., Ltd.). The chamber, the substrate, and the cell were degased.

Next, while the chamber was cooled by using liquid nitrogen, the cell for CdSe was heated at the temperature of 625° C., whereas the cell for $SnCl_2Pc$ was heated at the temperature of 330° C. While the molecular beam amount was selected to be approximately $1 \times 10^{-7}$ Torr to vapor-deposit by the beam flux monitor, the vapor deposition speed was adjusted. While the shutters mounted on the eject ports of the respective cells were alternately opened/closed, the organic layers 2 and the semiconductor layers 1 were alternately stacked on the substrate. The film thicknesses of the respective stacked layers were adjusted by controlling the open time of the shutters.

With respect to the manufactured composite multilayer film, the evaluation was made of a 3rd-order nonlinear optical characteristic related to the film optical modulation characteristic. The nonlinear susceptibility $\chi(3)$ was gradually increased when the periodic length became smaller than, or equal to 400 angstrom.

What is claimed is:

1. An organic/inorganic composite superlattice type optical modulator capable of inputting/outputting light, and capable of changing an optical characteristic including at least one of transmittance, reflectivity, and a refractive index of light in response to an externally controlled electric field, or light, wherein:

said organic/inorganic composite superlattice type optical modulator includes at least one type of a compound semiconductor layer and at least one type of an organic compound layer; a plurality of the compound semiconductor lavers and a plurality of the organic compound layers being provided; the compound semiconductor layer and the organic compound layer being alternately stacked in greater than one period; at least one of said compound semiconductor layer and said organic compound layer being crystalline; and a thickness of each of said layers is made larger than a Bohr radius of said compound semiconductor and smaller 10 times the Bohr radius.

2. An organic/inorganic composite superlattice type optical modulator as claimed in claim 1 wherein:

a total thickness of all of optical modulation layers containing said compound semiconductor layer and said organic compound layer is made at least ¼ times a wavelength of light to be modulated.

3. An organic/inorganic composite superlattice type optical modulator as claimed in claim 1 wherein:

said compound semiconductor layer contains at least one of elements, Zn, Cd, Se, Ga, As, In, and P.

4. An organic/inorganic composite superlattice type optical modulator as claimed in claim 1 wherein:

said compound semiconductor layer contains at least one of elements, Zn, Cd, Se, Ga, As, In, and P; and said organic compound layer contains a compound which is a solid under a condition of a pressure which is no greater than $1 \times 10^{-5}$ Torr and a temperature which is no greater than 300° C.

5. An organic/inorganic composite superlattice type optical modulator as claimed in claim 1 wherein:

said organic compound layer contains a metal phthalocyanine compound.

6. An organic/inorganic composite superlattice type optical modulator as claimed in claim 1 wherein:

a total thickness of all of optical modulation layers containing said compound semiconductor layer and said organic compound layer is made at least ¼ to ½ times a wavelength of light to be modulated.

* * * * *